(12) United States Patent
Misson

(10) Patent No.: US 6,474,225 B1
(45) Date of Patent: Nov. 5, 2002

(54) APPARATUS AND METHODS OF FORMING CHEESE BLOCKS

(76) Inventor: Charles Gregory Misson, 65 Taane Road, Maungatautari, Cambridge 2351 (NZ)

( * ) Notice: Subject to any disclaimer, the term of this patent is extended or adjusted under 35 U.S.C. 154(b) by 0 days.

(21) Appl. No.: 09/601,500

(22) PCT Filed: Dec. 2, 1999

(86) PCT No.: PCT/NZ99/00206
§ 371 (c)(1),
(2), (4) Date: May 15, 2001

(87) PCT Pub. No.: WO00/32032
PCT Pub. Date: Jun. 8, 2000

(30) Foreign Application Priority Data

Dec. 2, 1998 (NZ) ................................................ 333113

(51) Int. Cl.$^7$ .............................. A01J 25/11; A01J 25/12
(52) U.S. Cl. .............................. 99/454; 99/456; 99/458
(58) Field of Search ........................... 99/456, 458, 454, 99/452, 453

(56) References Cited

U.S. PATENT DOCUMENTS

| 4,061,794 A | 12/1977 | Charles | 426/486 |
| 4,224,865 A | * 9/1980 | Grosclaude et al. | 99/453 |
| 4,332,831 A | 6/1982 | Rust | 426/582 |
| 5,146,845 A | * 9/1992 | Pittelko | 99/454 |
| 5,572,925 A | 11/1996 | Pay et al. | 99/454 |
| 6,079,323 A | * 6/2000 | Dzenis | 99/454 |

FOREIGN PATENT DOCUMENTS

| IE | 41617 | 2/1980 |

* cited by examiner

Primary Examiner—Reginald L. Alexander
(74) Attorney, Agent, or Firm—Dorsey & Whitney LLP; Scott D. Rothenberger

(57) ABSTRACT

A number of cheese block forming towers are fed curds from a central vat. Curd accumulates in each tower and its weight causes whey to be expressed. Individual blocks are severed from the bottoms of the columns of curd by guillotine blades. A controller monitors both the output of each severing device (rate of discharge of blocks and their weight) and the rate of use of curd in each tower. The latter is determined by the same time that the level of curd takes to drop from sensor to sensor. These factors may then be used to adjust the output of severing devices or the charge rate of curd to balance the outputs of the multiple tower.

10 Claims, 1 Drawing Sheet

APPARATUS AND METHODS OF FORMING CHEESE BLOCKS

This application claims the priority of international application no. PCT/NZ99/00206, filed Dec. 2, 1999, and of New Zealand patent application no. 333113 filed Dec. 2, 1998, both of which are incorporated herein by reference.

TECHNICAL FIELD OF THE INVENTION

This invention relates to cheese block forming towers and in particular an installation involving several such towers (a multi-tower installation) fed from a common supply.

BACKGROUND OF THE INVENTION

Cheese block forming towers are known and consist primarily of a tower with an output severing device and associated block chamber at the base. Cheese curd is introduced into the top of a perforated whey extraction column within the tower. The curd at the bottom of the column is compressed by the weight of the curd thereabove causing the whey to be expressed through the perforations. A vacuum is also created in the tower to remove air from the whey and assist in the extraction of the whey. Individual blocks are severed from the bottom of the column of curd by the severing device that in some instances also further compresses the block.

Apparatus and methods of this type are described in various patents including UK Patents 1187964 and 1542844 and also U.S. Pat. Nos. 3,982,480 and 4,539,902. A critical function of these towers is to produce cheese blocks to a constant "standard" weight. Owing to the variance in the components of curd this can mean the processing time to achieve a block of a required weight varies during production. The throughput of these traditional towers has been published at nominally one "standard" 20 kg block of cheese curd every 1.5 minutes. In our NZ Patent Application 265118 we disclose a tower having a column height extended beyond that of the columns of traditional towers. The throughtput of our extended column tower is nominally one "standard" 20 kg block of cheese curd every minute. This is a significant increase over the traditional towers.

There remain various limitations to throughput of all these known towers particularly, as is normal, with multi-tower installations fed from a common supply of curd. In part this comes about owing to the inability of multi-tower installations to maintain a balance between the feed to the individual towers and the rate and sequence cheese blocks are discharged from the towers. On the one hand, the throughput capabilities of the towers can exceed the capability of the rest of a plant to provide sufficient input to the towers. Further, the throughput of one tower may be greater than one or more of the other towers of a multi-tower installation. This can also cause a fluctuating input to one or more of the towers and one or more of the towers may be starved of supply. On the other hand, if delay occurs in one or more of the towers from malfunction, excess processing time or otherwise the input to the towers may cause overloading necessitating or causing a shut down in one or more sections of the plant. The effect of this imbalance can be unacceptable weight variations in the blocks formed by a tower. This can necessitate inefficient downstream processing to "standardise" the blocks. Unacceptable product finish effects can also result. For example, cooling of the top of a curd column owing to excessive exposure to air in the absence of fresh curd arriving can cause excessive processing time and consistency problems.

An object of this invention is to provide a cheese block forming tower suitable for use in multi-tower installations that it is envisaged will provide an improved through-put over known towers while maintaining the appropriate integrity of cheese blocks produced. It is also envisaged that this invention will be suitable for use in combination with at least our other two inventions being concurrently filed. These claim priority from New Zealand patent application Nos. 333114 and Australian patent application PP 7743/98. A further object is to provide a useful choice over known apparatus.

DISCLOSURE OF THE INVENTION

According to one aspect of this invention there is provided a cheese block forming tower incorporating a whey supply inlet to a whey drainage column with a severing device having a cheese block support platform as the output thereof characterised in that control means are provided to substantially continuously monitor both the output of the severing device and the curd to cheese conversion pressing time of the tower to adjust at required intervals the output of the tower block severing device and simultaneously or as otherwise required also activate a charge of curd from the supply to the tower as to achieve a substantially uniform supply of curd to the tower.

According to a second aspect of this invention there is provided a cheese block forming tower as described in the preceding paragraph wherein the controller also adjusts the curd to cheese processing time dependent upon the frequency the supply of a recharge of curd occurs and controls the operation of the block platform to adjust the output of the tower.

According to a third aspect of this invention there is provided a cheese block forming tower installation comprising at least two block forming towers each incorporating a whey supply inlet to a whey drainage column with a severing device having a cheese block support platform as the output thereof, the towers being coupled to common curd supply characterised in that each tower has a pair of sensors mounted in spaced apart relationship one above the other in the column thereof to provide the controller with data on the block processing time of each tower, the controller also monitoring and controlling the operation of the severing device of each tower whereby the controller by substantially continuously monitoring both the output of the severing device and the curd to cheese conversion pressing time of each tower can adjust at required intervals the output of each tower block severing device and simultaneously or as otherwise required also activate a charge of curd from the supply to a tower as to achieve a substantially uniform supply of curd to each tower.

According to a fourth aspect of this invention there is provided a cheese block forming tower installation as described in the preceding paragraph wherein the controller also co-relates the output of the towers and adjusts the processing time of each to enable the controller to establish a forward sequence for the towers the controller determines to be next in line to discharge blocks and to so activate the severing devices of those towers.

BEST MODE OF CARRYING OUT THE INVENTION

Figure 1:
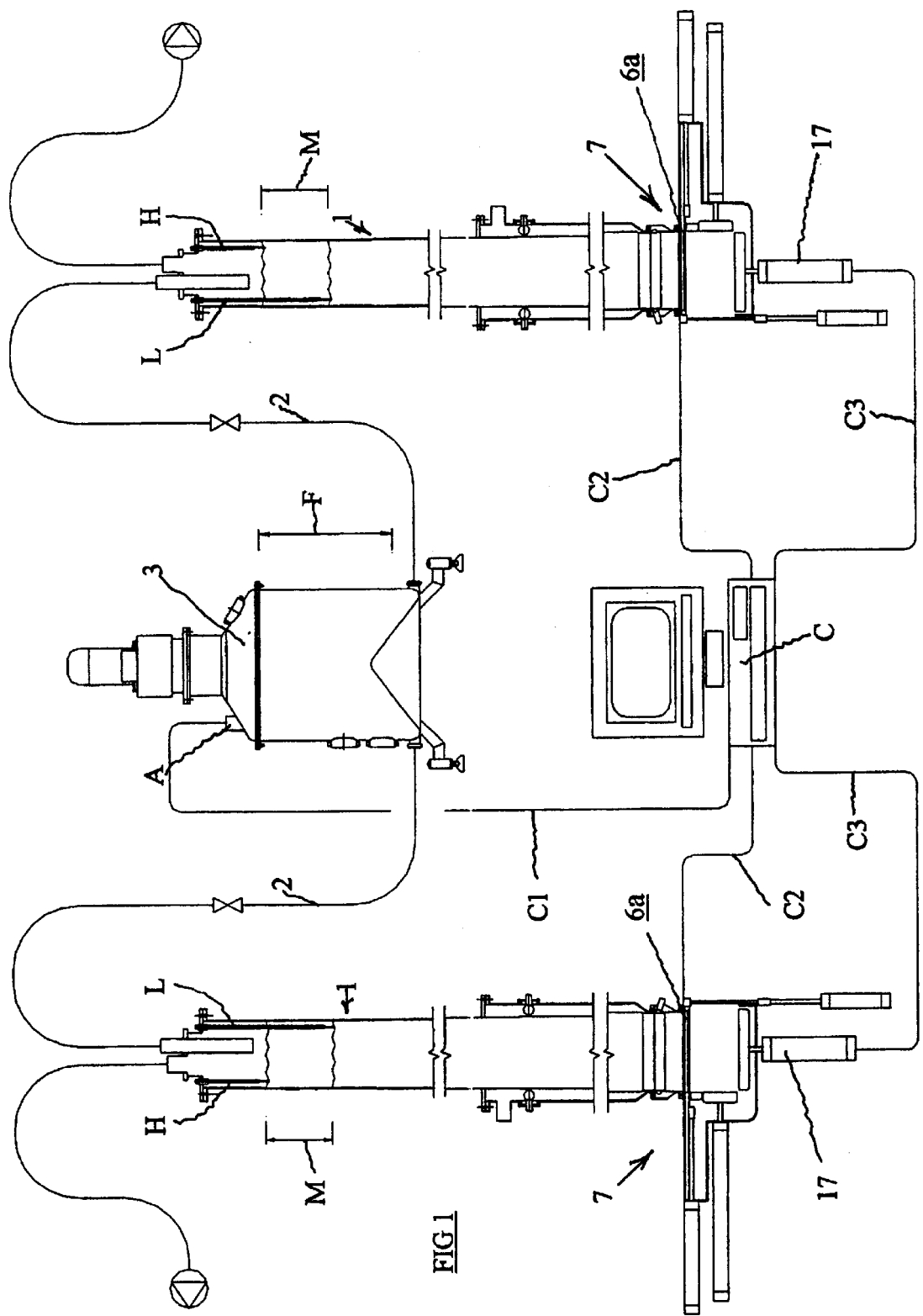
FIG. 1 is a partly schematic layout view of a multi-tower installation represented by two towers fed from a common supply with control means.

A plurality of towers 1 are fed by appropriate lines 2 from a common source such as curd-feeding vat 3. As indicated by line C1 controller "C" receives data from the supply vat 3. To that end sensors or similar monitors "A" are provided in vat 3 or in the supply thereto to ensure a nominally full "F" (indicated by line "F") charge is maintained therein.

As indicated by lines C2 controller "C" also monitors the output, including the curd processing time, of the towers 1. A "high" H sensor and a "low" sensor L are mounted in an upper section of each tower 1. The spacing (indicated by line "M") between sensors "H" and "L" equates with a multiple of an expected average processing time for a block in that tower 1. For example, the spacing may equate with the time it is expected that 3.5 blocks make take to be processed. Thus, following that time the height of a pillar of curd in the tower 1 can be expected to lower an amount substantially equal to the spacing between the sensors "H" and "L". Should the top of a curd pillar within the column fall below a lower of the sensors. The controller "C" preferably provides for a recharge of curd to the column.

As is conventional, a severing device 7 is provided at a lower end of each tower 1. Severing device 7 includes a ram operated load platform 17. In operation, with guillotine blade 6a of severing device 7 retracted load platform 17 is raised to support a curd pillar in a tower 1. The extent the platform 17 is lowered dictates what the height of a block severed from the pillar will be. This comes about with insertion of the blade 6a which severs a block from the pillar. It may be that at this stage platform 17 is marginally raised to compress a block against the underside of blade 6a. As indicated by lines C3 controller "C" monitors the operation of platform 17. Controller "C" notes at least the number of blocks, their discharge rate and the weight of blocks outputted from a tower.

Typically the towers 1 discharge the cheese blocks formed thereby onto a common packaging line (not depicted). Downstream processing and handling, which is often manually carried out, takes place at this stage. Particularly with a multi-tower installation involving numerous towers, random supply from the towers can cause delays. This random supply comes about because of the processing time and operational problems mentioned above. Controller "C" also co-relates the output of the towers 1 to control the sequence the towers 1 discharge their outputs. The controller "C" thereby establishes and preferably indicates a forward sequence for the towers the controller has determined to be the next in line to discharge blocks. The controller "C" activates in turn the severing devices of these towers. This enables downstream operations to be readily coordinated with the operation of the individual towers.

Thus, the performance of an individual tower 1 as well as all the towers 1 of a multi-tower installation and the common supply vat 3 can be monitored and controlled as required to achieve a processing balance including matching with downstream processing. This achieves a substantially uniform curd supply to a tower 1, a matching output from that tower 1 and a balancing with any other towers 1 in a multi-tower installation. Consequently it is envisaged that both the throughput of individual towers and the consistency of the blocks produced thereby will be enhanced.

What is claimed is:

1. A cheese block forming apparatus comprising:
    a cheese block forming tower;
    a whey and curd supply inlet;
    a whey drainage column;
    a severing device having a cheese block support platform; and
    a controller,
    wherein the cheese block forming tower includes the whey draining column and the severing device and is operably connected to the whey supply inlet, and the controller substantially continuously monitors the output from the severing device and the curd to cheese conversion pressing time to maintain a substantially uniform supply of curd to the cheese block forming tower.

2. A cheese block forming apparatus as claimed in claim 1 wherein the controller monitors the curd to cheese processing time dependent upon the frequency the supply of a recharge of curd occurs.

3. A cheese block forming apparatus as claimed in claim 1 or claim 2 wherein the controller monitors and controls the operation of the block support platform.

4. A cheese block forming apparatus comprising:
    a cheese block forming tower;
    a whey and curd supply inlet;
    a whey drainage column;
    a severing device having a cheese block support platform; and
    a controller,
    wherein the cheese block forming tower includes the whey draining column, the severing device and is operably connected to the whey supply inlet, and the controller is connected to a pair of sensors mounted in spaced apart relationship, one above the other, in the whey drainage column to substantially continuously monitor the output of the severing device and the curd to cheese conversion pressing time to maintain a substantially uniform supply of curd to the cheese block forming tower.

5. A cheese block forming apparatus as claimed in claim 4 wherein the controller monitors the curd to cheese processing time dependent upon the frequency the supply of a recharge of curd occurs and controls the operation of the block platform.

6. A cheese block forming apparatus as claimed in claim 4 or 5 wherein the spacing between the sensors is equal to a multiple of an average processing time for a cheese block in the tower and the controller activates a recharge of curd from a supply when the top of a curd pillar within the column falls below the lower of the sensors.

7. A cheese block forming apparatus comprising:
    at least two cheese block forming towers each tower including
    a whey and curd supply inlet;
    a whey drainage column;
    a severing device having a cheese block support platform; and
    a controller, wherein the towers are coupled to a common supply of cheese curd through the supply inlet and the controller substantially continuously monitors the output of the severing device and the curd to cheese conversion pressing time of each tower to maintain a substantially uniform supply of curd to each tower.

8. A cheese block forming apparatus as claimed in claim 7 wherein the controller adjusts for each tower the curd to cheese processing time dependent upon the frequency the supply of a recharge of curd occurs to that tower and controls the operation of the block platform.

9. A cheese block forming apparatus comprising
    at least two cheese block forming towers each tower including
    a whey and curd supply inlet;

a whey drainage column;

a severing device having a cheese block support platform; and a controller, wherein the towers are coupled to common curd supply and each tower has a pair of sensors mounted in spaced apart relationship, one above the other, in the whey drainage column to substantially continuously monitor the output of the severing device and the curd to cheese conversion pressing time of each tower to maintain a substantially uniform supply of curd to each tower.

10. A cheese block forming apparatus as claimed in claim 9 wherein the controller adjusts for each tower the curd to cheese processing time dependent upon the frequency the supply of a recharge of curd occurs to that tower and controls the operation of the block platform.

* * * * *